Nov. 15, 1966   D. J. BARNIER ETAL   3,285,565
REMOVABLE VALVE SEAT
Filed Feb. 26, 1964   2 Sheets-Sheet 1

INVENTOR.
DOUGLAS J. BARNIER
BY THOMAS H. STEGER

James E. Toomey
ATTORNEY

INVENTOR.
DOUGLAS J. BARNIER
BY THOMAS H. STEGER

ATTORNEY

United States Patent Office 3,285,565
Patented Nov. 15, 1966

3,285,565
REMOVABLE VALVE SEAT
Douglas J. Barnier, Fontana, and Thomas H. Steger, Crestline, Calif., assignors to Kaiser Steel Corporation, Oakland, Calif., a corporation of Nevada
Filed Feb. 26, 1964, Ser. No. 347,575
5 Claims. (Cl. 251—328)

This invention relates to a valve seat and more particularly to an improved replaceable valve seat for a valve that is subject to the flow of fluids at especially high pressures and temperatures. Accordingly, it is an object of this invention to provide an improved replaceable valve seat that can be externally fastenable in a unique fashion to the valve body. The device of the instant invention is particularly adaptable for use in the hot blast mains of metallurgical furnaces such as in blast furnace stoves.

This and other objects of the instant invention will become more apparent from a review of the following detailed description when taken in conjunction with the accompanying drawings, wherein FIG. 1 is a perspective view of a valve embodying the present invention;

Figure 1:
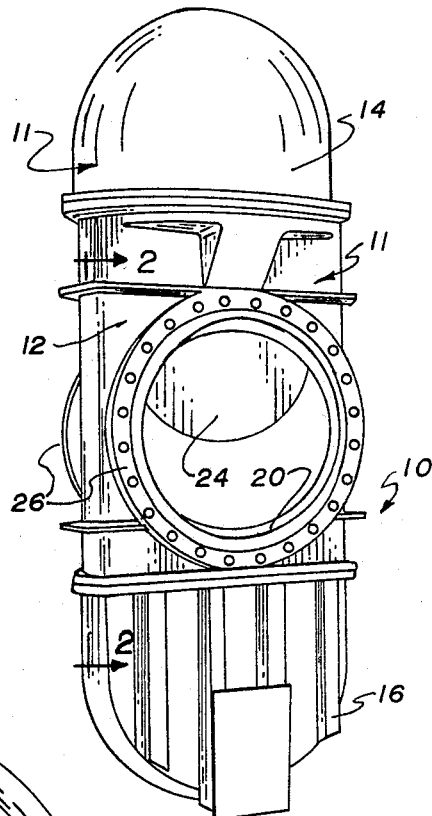
Figure 3:
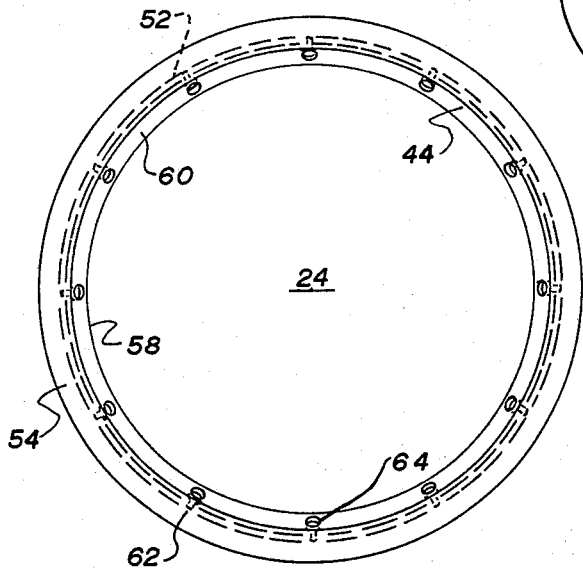
FIG. 3 is a plan view of the replaceable valve seat of the present invention.
Figure 2:
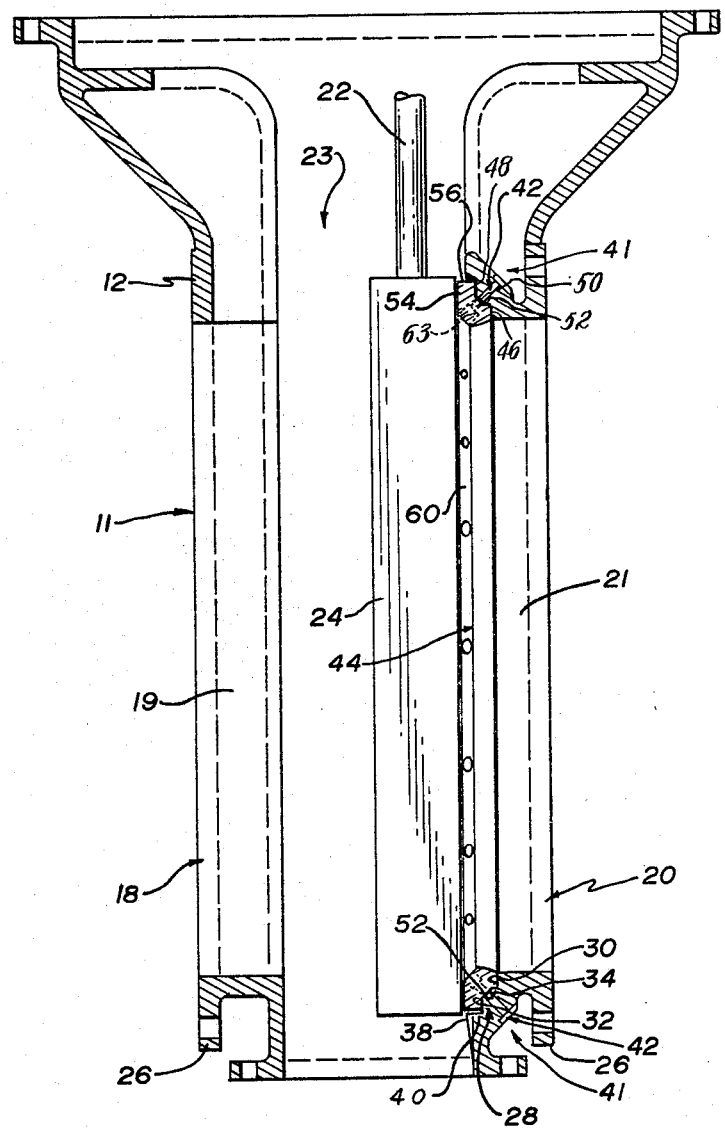
FIG. 2 is a cross section of an intermediate portion of the valve body shown in FIG. 1 when taken generally along line 2—2 thereof and with certain parts removed to illustrate more clearly various details of the present invention.

It is to be understood that like reference numbers correspond to like parts in the drawings. With further reference to the drawings and in particular FIGS. 1 and 2, a valve 10 in which the instant invention is useful comprises a valve body 11 generally consisting of three assembled parts, an intermediate hollow section or body portion 12 flange connected at either end to the end flanges of the caps 14 and 16. This intermediate body portion 12 is provided with aligned openings 18 and 20 at each side and these openings are in open communication with the hollow interior of the body portion 12. The peripheries of the openings 18 and 20 are defined by the cylindrical surfaces 19 and 21.

The interior chamber 23 of body portion 12 extends in a direction generally normal to the axis of openings 18 and 20 and a proper valve is operatively arranged within this chamber. The valve proper includes a valve stem 22 and a valve disc 24 that is selectively positionable to an open position to permit fluid flow between and through the openings 18 and 20 or to a closed position, such as shown in FIG. 2, in order to block the flow of fluid between the openings 18 and 20. The valve disc 24 is shown in a partially opened position in FIG. 1 and only one end of the valve stem 22 is shown in FIG. 2. It is to be understood that the valve proper of which only the stem 22 and disc 24 portions are shown can be of conventional construction and that disc 24 can have a larger cross-sectional width than is illustrated.

The valve 10 is adapted to be suitably disposed within the piping of a hot fluid main and secured thereto by means of the annular flanges 26 on the outer ends of the openings 18 and 20. It is to be understood that each flange 26 and the associated flanged end of the pipe line include alignable openings for bolt connection in a suitable fashion. The inner end of the surface 21 of the opening 20 advantageously includes or is bounded by a stepped annular recess 28 made up of spaced converging wall portions or shoulders 30 and 32 interconnected by a beveled or chamfered surface 34 and an annular surface 36. The inner periphery of the shoulder 30 is connected to the inner end of the surface 21. More specifically, the surface 36 extends inwardly from the outer periphery of the shoulder 30 to connect with the beveled surface or wall portion 34 that extends outwardly to the inner periphery of the shoulder 32. Disposed intermediate the inside chamber wall 38 adjacent the recess 28 and the outer periphery of the shoulder 32 is a cylindrical surface 40 which has the largest diameter of the stepped recess 28. A plurality of circumferentially spaced bores 42 extend through the valve body section 12 between the stepped recess 28 and the outer wall of the valve body section 12 at the area indicated by the reference numeral 41. Bores 42, two of which are shown in FIG. 2, terminate at one end at the beveled surface 34 and at the other end at the outer wall of the valve body section 12. The axis of each bore 42 is disposed substantially perpendicular to the beveled surface 34.

Figure 4:
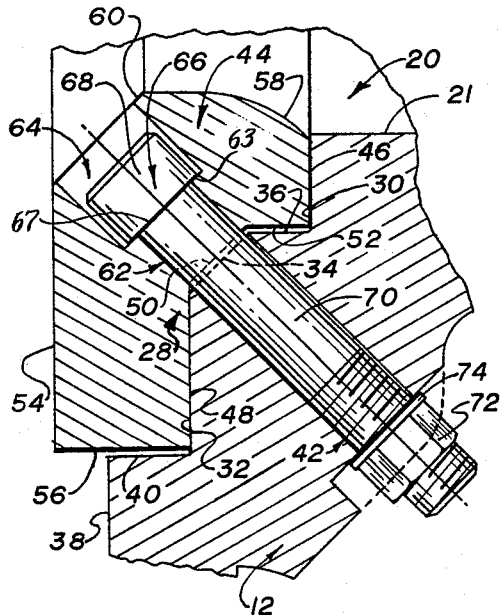
FIG. 4 is an enlarged fragmented sectional view of a portion of the valve body shown in FIG. 2 and illustrates the unique manner in which the valve seat is connected to the valve.

The purpose of the stepped recess 28 is to permit mating attachment preferably of one surface of the replaceable valve seat 44 with one surface of the valve body section 12. Valve seat 44 includes axially spaced, radially extending surfaces 46 and 48 in which surface 48 is of the greater radial extent. Cylindrical surface 52 of valve seat 44 is connected at one end to the outer periphery of the radial surface 46 and at the other end to an outwardly extending beveled surface 50. Surface 50 also connects with the inner periphery of the other radial surface 48. When the seat 44 is matingly inserted within the stepped recess 28, it is readily evident form a review of FIGS. 2 and 4 that only valve seat surface 48 is seated against the oppositely disposed shoulder 32 of the recess 28 while the other surfaces 46, 50 and 52 of the seat 44 are oppositely disposed from and in spaced relationship to the other shoulder 30 and other surfaces 34 and 36 of the stepped recess 28. To enable mating attachment of only the oppositely disposed surfaces 32 and 48, sufficient clearance spaces as best shown in FIG. 4 are allowed between the oppositely disposed surfaces 40 and 56, 34 and 50, 36 and 52, and 30 and 46. The clearance space between the surfaces 30 and 46 is the least in extent. In one application, the clearance spaces between surfaces 40 and 56, 34 and 50, and 36 and 52 extends one-sixteenth of an inch, while the clearance space between surfaces 30 and 46 extends one-ten thousandth of an inch. These clearance spaces assure mating attachment of the surfaces 32 and 48 even where the valve seat 44 expands relative to the body section 12 due to its direct exposure to the high temperature fluid medium passing through the valve.

It is to be noted here that in order to attach the valve seat 44 to the valve body section within stepped recess 28, the seat 44 is first preferably inserted into the chamber 23 through the flanged end of the body section 12 associated with the disconnectable cap 16. The reason for this is due to the fact that the valve seat 44 is normally of larger diameter than the opening 18.

The remaining surfaces of the seat 44 include an inwardly disposed valve disc seating face 54, a radially extending mating face 56, an annular surface 58 which is of partially arcuate shape and a beveled surface 60. The beveled surface 60 extends to the inner periphery of the valve disc seating face 54.

A plurality of bores 62 extend between the beveled surfaces 50 and 60 of the seat 44. Each bore 62 is disposed substantially perpendicular to the beveled surfaces 50 and 60, as well as being of a diameter that is somewhat smaller than the length of the beveled surfaces 50 and 60. Each bore 62 at the end adjacent the surface 60 includes a counter bore 64, the axial extent of which is sufficient to enclose the enlarged head end of a fastener 66, such as is shown in FIG. 4. It is to be observed that the length of the beveled surface 60 is greater than the beveled surface 50 in view of the particular annular shape of the seat 44.

When the valve seat 44 is inserted into the valve body section 12 for mating attachment therewith within the recess 28, each bolt fastener 66 is inserted through each counter bore 64 to thereby extend through the aligned bores 42 and 62 in the manner shown in FIG. 4. The bolt fastener 66 is of conventional construction and includes an enlarged head end 68 disposed within the counter bore 64, a shank 70 extending the length of the aligned bores 42 and 62, a nut 72 and washer 74 fastened onto the threaded end of the shank 70 that projects beyond the outer wall of the valve body section 12. It is to be observed that the outer wall of valve body section 12 adjacent the end of the bore 42 is also counterbored to provide proper seating faces for the washers 74 when the nuts 72 are fastened to their respective bolts 66. When the fasteners 66 disposed within the aligned bores 42 and 62 are all externally fastened in the manner shown in FIG. 4, the surface 48 of the valve seat 44 will be securely attached to the surface 32 of valve body section 12. It is to be further observed that when the fasteners 66 are drawn up, the head of the fastener 66 is only in surface-to-surface contact with the valve seat 44 at the point of contact between the oppositely disposed annular shoulders 67 and 63 of the fastener 66 and the valve seat 44, while the washer 74 is in surface-to-surface contact with the outer surface of the body section 12 of the valve.

Before the valve 10 is initially inserted into a pipe line, it is determined which end of the pipe line has the greater fluid pressure when the pipe line is blocked off by the valve disc 24. The reason for this is because the valve structure dictates that the greater fluid pressure should act against one planar face of the valve disc 24 to thereby contribute to the seating engagement of the opposite planar face of the valve disc with the seating face 54 of the valve seat 44. In FIG. 2, for example, when the valve body section 12 is inserted into a pipe line, the greater pressure fluid has been determined to act against the left planar face of the disc 24, while the right planar face is brought in seating engagement with the seating face 54 of the seat 44. Consequently, the greater fluid pressure acting against the valve disc 24 will assure positive seating engagement of the valve disc 24 and the valve seat 44 and thereby prevent fluid leakage therebetween. Since fasteners 66 are disposed at an acute angle to the seating face 54, these fasteners 66 maintain the seat 44 securely attached to the stepped recess 28 so that no pressure fluid leakage occurs therethrough. In one advantageous application of the instant invention, the valve 10 can be used as a blast furnace stove shut-off valve which is normally subject to varying and extremely high temperatures and pressures. By virtue of the use of angle bolt fasteners 66, and the aforementioned clearance spaces between the attached seat 44 and body section 12, the valve seat 44 can withstand temperature expansions of the valve seat 44 in either axial and/or radial direction without affecting the overall seating engagement of the seating face 54 with the valve disc 24. Furthermore, the spaced circumferential disposition of the various angle bolt fasteners 66 effectively prevent distortion of any section of the attached seat 44, including face 54, and each one can be adjusted or tightened independently of the others. In the event of any leakage past the seat 44, the bolt fasteners 66 can be individually adjusted externally of the valve body thus avoiding removal of the valve 10 itself from the pipe line. It is also to be understood that although only one of the openings 20 of the valve body section 12 has been shown and described as being provided with a removable valve seat of the type described, the other valve body opening 18 may likewise be so constructed that it too can be provided with a similar removably disposed valve seat 44.

From the above, it will be obvious that a unique replaceable valve seat has been herein provided for a valve wherein the valve seat can be externally fastened to the valve. It is obvious, therefore, that various changes and modifications may be made to the instant device without departing from the spirit and scope thereof as defined in the appended claims, wherein

What is claimed is:

1. In a valve device of the type described, the combination of a valve body provided with an opening bounded by spaced convergent wall portions connected by a beveled wall portion, a valve seat removably disposed adjacent said opening and provided on one side thereof with opposing convergent facial portions only one of which portions is adapted to fully mate and be in surface-to-surface contact with one of the wall portions bounding said valve body opening and on the other side thereof with a planar surface, valve disc means engageable with the planar surface of said valve seat and externally adjustable fastener means for holding said valve seat in position adjacent said valve body opening, said fastener means projecting through aligned openings located in said valve body and said valve seat, the axes of said openings being located intermediate the respective convergent wall portions of the valve body and the opposing convergent facial portions of the valve seat, whereby upon anchoring of said valve seat in position the entire surface area of the planar surface of said valve seat can contact the valve disc means when said valve disc means is disposed in a closed position.

2. In a valve device of the type set forth in claim 1, wherein the axes of said aligned openings are also located at an acute angle relative to said convergent valve body wall portions and said valve seat mating facial portion.

3. In a valve device of the type described, the combination of a valve body provided with spaced openings in flow communication, a valve seat removably disposed adjacent one of said openings and valve means selectively positionable to close off the flow of material passing through the valve device by engagement with said valve seat, said valve seat having a seating face engageable with said valve means and a plurality of spaced bores extending therethrough, the bores being disposed adjacent and at an angle to the seating face in such a fashion that one end of each bore is located adjacent the seating face while the other end is located adjacent said one of said valve body openings and said valve body also having a pair of spaced yet convergent wall portions connected by a beveled portion and a plurality of bores extending therethrough and at said beveled portion from the outside surface thereof adjacent said one of said openings, and each of said last-mentioned bores being axially aligned with a bore in said valve seat, an externally adjustable fastener element extending through each pair of aligned bores for locking said valve seat to said valve body in such a fashion that substantially the entire surface area of the seating face of the valve seat is arranged to contact the valve means when the valve means is positioned to close off the flow between the openings and with the pressure of the material flowing through said valve device acting against the valve means to assure positive contact between the valve means and the seating face of the valve seat.

4. In a valve device of the type described, the combination of a valve body provided with spaced openings in flow communication, a valve seat removably disposed adjacent one of said openings and a valve means selectively positionable to block the flow of material passing through the valve device, said valve seat being provided with a pair of spaced yet convergent wall portions connected by a beveled portion, a seating face engageable with said valve means and a plurality of spaced bores extending therethrough and at said beveled portion, the bores being disposed adjacent and at an acute angle to the seating face in such a fashion that one end of each bore is located adjacent the seating face and the other end is located adjacent said one of said valve body openings, said valve body also having a plurality of bores extending therethrough adjacent said one of said valve body openings and each of said last-mentioned bores being axially aligned with a bore in said valve seat, an externally adjustable fastener element extending through each pair of aligned bores for locking said valve seat to said valve body and said bores and fastening elements all being disposed at an acute angle relative to the axes of said valve seat, said one of said openings in said valve body and said valve means.

5. In a valve device as set forth in claim 4, wherein the ends of the bores in said valve seat and valve body are disposed in the beveled wall portion of said body and an oppositely disposed facial portion in said valve seat.

References Cited by the Examiner

UNITED STATES PATENTS 1,457,318  6/1923  Shevlin _____ 251—360

FOREIGN PATENTS 436,294  10/1935  Great Britain.
821,756  10/1959  Great Britain.

M. CARY NELSON, *Primary Examiner.*

ARNOLD ROSENTHAL, *Examiner.*